United States Patent [19]

Emerson et al.

[11] Patent Number: 5,211,428

[45] Date of Patent: May 18, 1993

[54] GAS PIPE SLIP BOOT

[75] Inventors: Gerald G. Emerson, Corona Del Mar; Kenneth E. Schick, Lake Elsinore, both of Calif.

[73] Assignee: Serrot Corporation, Huntington Beach, Calif.

[21] Appl. No.: 848,268

[22] Filed: Mar. 9, 1992

[51] Int. Cl.⁵ .............................................. F16L 5/00
[52] U.S. Cl. .................................... 285/158; 285/192; 285/200; 285/351; 285/302; 405/128; 405/129
[58] Field of Search .................... 285/42, 43, 44, 351, 285/302, 200, 192, 158; 405/128, 129

[56] References Cited

U.S. PATENT DOCUMENTS

| | | |
|---|---|---|
| 558,025 | 4/1896 | Barry, Jr. . |
| 1,299,423 | 4/1919 | Bropson . |
| 1,538,433 | 5/1923 | Hirshstein . |
| 2,985,465 | 5/1961 | Church ............................ 285/43 X |
| 3,345,089 | 10/1967 | Stepanich ........................ 285/35 X |
| 4,010,578 | 3/1977 | Logsdon .......................... 285/44 X |
| 4,160,347 | 7/1979 | Logsdon .......................... 285/42 X |
| 4,802,792 | 2/1989 | Flessas ............................ 405/53 |
| 4,838,733 | 6/1989 | Katz ................................ 405/129 |
| 5,060,986 | 10/1991 | Carter ............................. 285/158 |

FOREIGN PATENT DOCUMENTS 1172447 2/1959 France ................... 285/302

Primary Examiner—Dave W. Arola
Attorney, Agent, or Firm—Klein & Szekeres

[57] ABSTRACT

An axially slidable pipe boot provides a substantially gas-tight seal between a gas vent pipe and a flexible barrier sheet surrounding the pipe. In a first preferred embodiment, the slidable pipe boot comprises a tubular sealing member having an internal O-ring seal. The tubular member is dimensioned to fit around the exterior of the pipe with a compression fit of the O-ring providing a sealing engagement with the pipe. An annular flange on the lower end of the tubular member is sealingly attached to the barrier sheet. In a second preferred embodiment, upper and lower tubular sealing members are axially joined together by a hollow tubular sleeve that fits around the pipe. Each of the tubular members has an internal O-ring seal that engages the exterior of the pipe with a substantially gas-tight compression fit. The lower tubular member has an annular flange that is sealingly attached to the flexible sheet. One or both of the tubular members may have an inwardly-directed annular lip, the inside diameter of which is slightly larger than the outside diameter of the pipe. The lip keeps dirt and debris out of the tubular member.

13 Claims, 1 Drawing Sheet

U.S. Patent          May 18, 1993          5,211,428
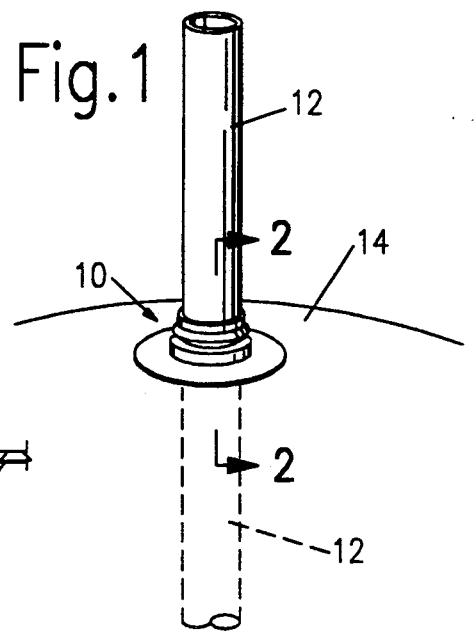
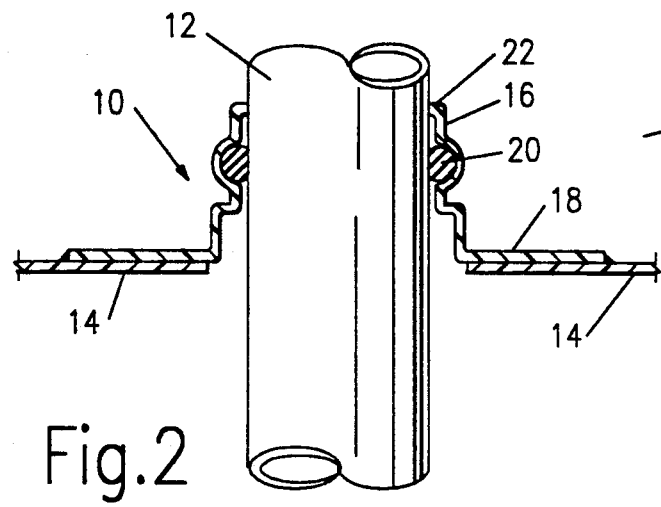
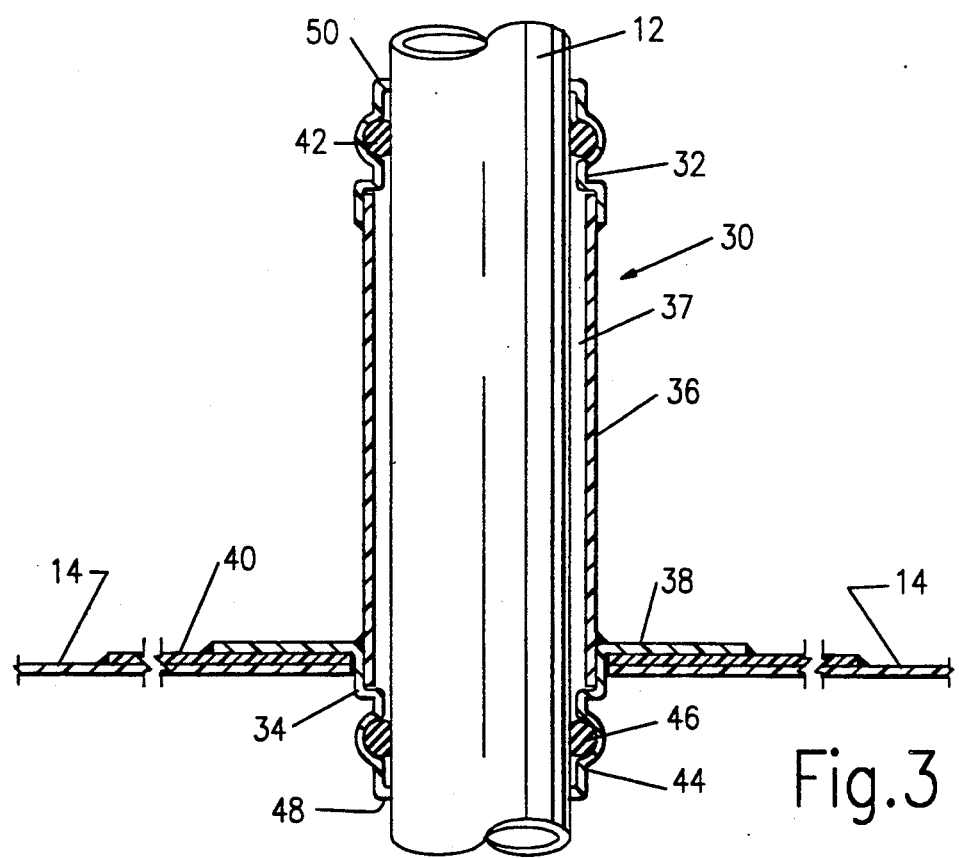

GAS PIPE SLIP BOOT

BACKGROUND OF THE INVENTION

This invention relates generally to the field of devices that provide a fluid-tight seal between a flexible sheet or membrane and a rigid member extending through the sheet or membrane. More specifically, the present invention relates to a coupling or "boot" that provides a fluid-tight seal around a gas conduit or pipe that extends through a flexible sheet covering a landfill or the like.

Landfills continue to be one of the principal means used for the disposal of solid waste, and particularly biodegradable waste materials. In recent years, increased attention has been paid to environmental concerns in the design, construction, and use of solid waste landfills, leading to innovations that substantially mitigate the environmental impact of such landfills.

Among the recent innovations are those that provide for the compaction of the solid waste, thereby increasing the capacity of the landfill. An example of a modern landfill compaction system is disclosed in U.S. Pat. No. 4,838,733—Katz. In such landfill compaction systems, the landfill is covered with a flexible, fluid-impermeable barrier sheet. The barrier sheet is penetrated by gas vent pipes for venting methane gas generated by the decomposition of organic matter within the landfill. The vent pipes typically conduct the gas to a storage tank or a facility where the vented gas can be burned off.

Environmental considerations require the vented gas to be isolated from the atmosphere. Therefore, a gas-tight seal must be provided between each of the vent pipes and the barrier sheet. Because the sheet moves vertically with respect to the pipes, due to settling and compaction of the landfill, the seals between the pipes and the sheet must likewise move vertically (or axially), while maintaining seal integrity. Thus, for example, the system described in the above-mentioned Katz patent employs a lower collar slidably fitting around each pipe, and joined to the sheet with a gas-tight seal. The lower collar is joined to a fixed upper collar by a bellows-like sealing sleeve. Subsidence of the landfill is accommodated by the downward movement of the lower collar and the vertical extension of the sealing sleeve, thus maintaining seal integrity.

One disadvantage of the above-described seal structure is that the range of vertical movement is limited by the placement of the fixed upper collar. Thus, subsidence below a certain level will require replacement of the seal structure, while a sudden sinking of the landfill (due to, for example, a shifting of the landfill material or the underlying ground) could result in breakage of the seal.

Another prior art approach is the use of what is termed a "penetration sleeve". The penetration sleeve is a hollow tubular sleeve that fits around the pipe and extends from below the barrier sheet, through a hole in the barrier sheet, to above the sand and soil layers that are typically placed on top of the barrier sheet. The barrier sheet material surrounding the hole is formed into a tubular boot that is sealed around the exterior of the penetration sleeve. The diameter of the penetration sleeve is greater than that of the pipe, and the space between the sleeve and the pipe is filled with a substance such as bentonite. This approach has two major shortcomings: (1) The bentonite filler tends to dessicate and shrink, thereby degrading the seal between the boot portion of the barrier sheet and the pipe; and (2) there is little or no tolerance for relative movement between the penetration sleeve and the boot portion of the barrier sheet.

Thus, there has been a need for a sealing structure that can accommodate extreme and sudden vertical movements of the landfill, while maintaining seal integrity. Furthermore, there has been a need for such a sealing structure that is inexpensive, easily installed, durable, and weather-resistant.

SUMMARY OF THE INVENTION

Broadly, the present invention is a self-sealing, slidable pipe boot having means in its interior for providing an axially slidable, gas-tight sealing engagement with the exterior surface of the pipe, and means on its exterior for a gas-tight sealing attachment to the barrier sheet surrounding the pipe, and through which the pipe emerges.

More specifically, in a first preferred embodiment, the invention comprises a tubular sealing member dimensioned to fit around the exterior of the pipe, and having a resilient internal O-ring seal, dimensioned to engage the pipe surface with a tight, but slidable fit, so as to maintain a gas-tight sealing engagement with the pipe. The sealing member has an external annular flange, adapted for sealing attachment to the barrier sheet, and a radially inwardly-directed annular lip, the inside diameter of which is dimensioned to come in close proximity to the exterior pipe surface.

A second preferred embodiment comprises upper and lower sealing members, joined by a hollow, tubular sleeve. The sleeve is diametrically larger than the pipe, so that its interior surface is radially spaced from the exterior pipe surface. The lower sealing member includes an annular flange that is adapted for sealing attachment to the barrier sheet. Both sealing members are dimensioned to fit around the exterior of the pipe, and both sealing members include the internal O-ring seal and the inwardly-directed annular lip described above.

In use, the annular flange of the flanged sealing member is sealingly attached to the barrier sheet around the aperture through which the pipe emerges. The internal O-ring seal provides an axially-slidable gas-tight seal against the exterior pipe surface. The internally-directed lip keeps dirt, soil, and sand out of the sealing member, and, in the second embodiment, also serves to wipe such material off of the pipe as the sealing member moves along the pipe's surface.

The invention thus provides a gas-tight seal between the pipe and the barrier sheet that has a virtually limitless range of vertical movement, and that maintains its integrity throughout its range of movement. As will be better appreciated from the detailed description that follows, the invention is inexpensive to construct and easily installed. Furthermore, it requires little or no maintenance, and can be so constructed as to be quite durable and weather-resistant.

BRIEF DESCRIPTION OF THE DRAWINGS

FIG. 1 is a perspective view of a first preferred embodiment of the invention, providing a seal between a landfill barrier sheet and a gas vent pipe emerging through the sheet;

FIG. 2 is partial cross-sectional view, taken along line 2—2 of FIG. 1, showing the invention in cross-section and the pipe in elevation; and FIG. 3 is a view similar to that of FIG. 2, but showing a second preferred embodiment of the invention in cross-section.

DETAILED DESCRIPTION OF THE INVENTION

Referring first to FIGS. 1 and 2, a slip boot 10, in accordance with a first preferred embodiment of the invention, is shown installed as a seal between a land fill gas vent pipe 12 and a flexible membrane liner or barrier sheet 14. In actual use, the barrier sheet is covered by a layer of topsoil, with a layer of sand sometimes used between the topsoil and the barrier sheet. The sand and topsoil layers have been omitted from the drawings for better clarity. The barrier sheet 14 is typically made of High Density Polyethylene (HDPE) or Very low Density Polyethylene (VLDPE), depending on the particular characteristics of the landfill. The pipe 12 is typically made of HDPE or PVC.

The slip boot 10 comprises a tubular sealing member 16, formed of vacuum-molded pipe-grade HDPE, with a carbon black content meeting ASTM 1248-A, PE34, Class C. The sealing member 16 is dimensioned to fit around the exterior surface of the pipe 12. The lower end of the sealing member 16 has an integral annular flange 18 that extends radially outwardly. The flange 18 is extrusion welded to the barrier sheet 14, forming a flexible, gas-tight seal. The thickness of the barrier sheet 14, relative to the thickness of the flange 18, has been greatly exaggerated in the drawings for illustrative purposes only. In actuality, the thickness of the barrier sheet is much less than that of the flange 18.

The interior surface of the sealing member has an annular circumferential groove in which is seated an O-ring gasket seal 20, made of neoprene rubber, preferably with a durometer hardness of about 55 shore. The uncompressed inside diameter of the O-ring seal 20 is slightly smaller (preferably about 0.5 mm) than the outside diameter of the pipe, so that the O-ring seal is slightly compressed, thereby providing an intimate, yet slidable engagement between the pipe and the O-ring seal. To facilitate the installation of the slip boot 10 onto the pipe 12, the pipe is first coated with vegetable compound lubricant, and the outer or upper end (not shown) of the pipe is formed with a chamfer of about 60°.

The upper end of the sealing member 16 has a wipe ring 22, formed as an integral, radially inwardly-extending annular lip. The inside diameter of the wipe ring 22 is advantageously slightly larger (preferably about 0.25 mm) than the outside diameter of the pipe. The wipe ring 22 helps keep dirt, sand, and debris out of the interior of the sealing member 16 when the slip boot 10 is buried under sand and/or soil, as mentioned above.

In use, the slip boot 10 is slipped over the pipe, and its flange 18 is extrusion welded to the barrier sheet 14, as described above. A gas-tight seal is thus formed between the sheet 14 and the flange 18, and between the O-ring seal 20 and the pipe 12. The O-ring seal 20 slides along the exterior surface of the pipe 12 as the barrier sheet moves vertically with respect to the pipe, as a result of landfill settlement, or earth subsidence or heaving. The intimate engagement between the O-ring seal 20 and the pipe is maintained throughout this vertical movement, thereby maintaining the integrity of the gas-tight seal.

Turning now to FIG. 3, a slip boot 30, in accordance with a second preferred embodiment of the invention, is shown. The slip boot 30 of FIG. 3 is advantageous for use in areas requiring a drainage system, where a layer of sand is placed on top of the barrier sheet before the soil layer put in place.

The slip boot 30 comprises an upper sealing member 32 and a lower sealing member 34, formed of vacuum molded HDPE, as in the previously-described embodiment. The sealing members 32 and 34 are axially joined by a hollow, tubular sleeve 36, the latter having an upper end extrusion welded to the upper sealing member 32, and a lower end extrusion welded to the lower sealing member 34. The inside diameter of the sleeve 36 is measurably larger than the outside diameter of the pipe 12, creating a space 37 therebetween.

The upper end of the lower sealing member 34 has an integral annular flange 38, directed radially outwardly. The flange 38 is extrusion welded to an annular collar 40, also formed of HDPE, which, in turn, is extrusion welded to the barrier sheet 14. A flexible, gas-tight seal is thus formed by the flange 38, the collar 40, and the barrier sheet 14. (As in FIG. 2, the thickness of the barrier sheet is exaggerated in FIG. 3.)

Both the upper and lower sealing members are provided with O-ring gasket seals of the type described above in connection with the first preferred embodiment of the invention. Specifically, the upper sealing member 32 has an internal circumferential groove in which is seated an upper O-ring seal 42. The lower sealing member 34 has a downwardly extending tubular portion 44 that extends below the barrier sheet 14. The tubular portion has an internal circumferential groove in which is seated a lower O-ring seal 46. As in the previously-described embodiment, the O-ring seals 42 and 46 have an inside diameter that is slightly smaller (i.e., about 0.5 mm) than the outside diameter of the pipe, and the upper end (not shown) of the pipe is chamfered to facilitate installation of the slip boot.

As in the sealing member of the previously described embodiment, each of the upper and lower sealing members of the second preferred embodiment is provided with a wipe ring. Specifically, a lower wipe ring 48 is formed as an integral, radially inwardly-directed annular lip at the lower end of the lower sealing member 34, and an upper wipe ring 50 is formed as a similar integral annular lip at the upper end of the upper sealing member 32. As in the previously-described embodiment, the wipe rings 48 and 50 of the instant embodiment have inside diameters that are preferably about 0.25 mm larger than the outside diameter of the pipe. The wipe rings 48 and 50 keep dirt, soil, and sand out of the interior of the slip boot, as in the previously-described embodiment. Moreover, in the instant embodiment, the lower wipe ring 48 wipes dirt and debris off of the pipe as the slip boot 30 moves downwardly along the pipe, thereby relatively clean surface for better sealing by the O-ring seals.

Installation of the instant embodiment is as follows: The slip boot 30, comprising the upper and lower sealing members (including the O-ring seals), joined by the sleeve 36, is slipped down over the pipe, which has been lubricated with a vegetable compound lubricant. The flange 38 is extrusion welded to the collar 40, which has been extrusion welded to the barrier sheet. Prior to burial of the pipe under sand and soil, it is advantageous to pressure test the slip boot to assure that it is gas-tight. To this end, a hole (not shown) may be provided in the sleeve 36 to allow pressurized air to be introduced into the space 37. If there are no leaks, the hole is sealed by extrusion welding, and the pipe is buried, leaving at least a substantial part of the upper sealing member 32 exposed.

As in the previously-described embodiment, the O-ring seals 42 and 46 slide along the exterior surface of the pipe as the barrier sheet moves vertically with respect to the pipe. The intimate engagement between the O-ring seals and the pipe is maintained throughout this vertical movement, thereby maintaining the integrity of the gas-tight seal.

From the foregoing description, the advantages of the present invention will be readily apparent. Specifically, a secure, gas-tight seal is maintained between barrier sheet and the slip boot, and between the slip boot and the pipe, throughout a nearly unlimited range of relative vertical movement between the pipe and the sheet. Moreover, sudden vertical shifts of the barrier sheet are accommodated with little or no likelihood of seal breakage. Thus, the present invention offers long-term durability and reliability, along with economy of manufacture and ease of installation.

While the preferred embodiments of the invention have been described above, it will be appreciated that a number of variations and modifications will suggest themselves to those skilled in the pertinent arts. For example, while the preferred materils for making the invention have been disclosed, other materials may be found that will provide adequate results. Moreover, alternative configurations for the sealing members may be found, which, for example, have different configurations and/or locations for the O-ring seal. These and other modifications and variations should be considered within the spirit and scope of the invention, as defined in the claims that follow.

What is claimed is:

1. A device for providing a substantially gas-tight seal between a pipe and a flexible sheet surrounding the pipe, comprising:
    a first tubular sealing member dimensioned to fit around the exterior of the pipe, the sealing member having an interior and an exterior and a first end and a second end;
    a second tubular sealing member dimensioned to fit around the exterior of the pipe and having an interior and an exterior;
    first sealing means, in the interior of the first sealing member, for providing an axially-slidable, substantially gas-tight sealing engagement with the exterior surface of the pipe;
    second sealing means, on the exterior of the first sealing member adjacent the second end thereof, for providing a substantially gas-tight attachment to the sheet;
    an inwardly-directed annular lip, adjacent to and integral with, the first end of the first sealing member, the lip having an inside diameter that is slightly larger than the outside diameter of the pipe;
    a hollow tubular sleeve dimensioned to fit around the exterior of the pipe and having a first end sealingly attached to the first sealing member and a second end sealingly attached to the second sealing member, thereby joining the first and second sealing members in axial alignment; and
    third sealing means, in the interior of the second sealing member, for providing an axially-slidable, substantially gas-tight sealing engagement with the exterior surface of the pipe.

2. The device of claim 1, wherein the first sealing means includes an O-ring seal disposed in the interior of the first sealing member.

3. The device of claim 2, wherein the uncompressed inside diameter of the O-ring seal is slightly smaller than the outside diameter of the pipe, whereby the O-ring seal is slightly compressed when it is engaged against the exterior of the pipe.

4. The device of claim 1, wherein the second sealing means comprises an annular flange extending outwardly from the exterior of the first sealing member.

5. The device of claim 1, wherein the third sealing means includes an O-ring seal disposed in the interior of the second sealing member.

6. The device of claim 5, wherein the uncompressed inside diameter of the O-ring seal of the third sealing means is slightly smaller than the outside diameter of the pipe, whereby the O-ring seal of the third sealing means is slightly compressed when it is engaged against the exterior of the pipe.

7. The device of claim 1, wherein the second sealing means is adjacent the second end of the first sealing member.

8. The device of claim 7, wherein the inwardly-directed annular lip is an inwardly-directed annular first lip, and wherein the third sealing means has a first end joined to the sleeve and a second end, the second end of the third sealing means having an inwardly-directed annular second lip, the inside diameter of the second lip being slightly larger than the outside diameter of the pipe.

9. A device for providing a substantially gas-tight seal between a pipe and a flexible sheet surrounding the pipe, comprising:
    a first tubular sealing member, having an interior and an exterior, dimensioned to fit around the exterior of the pipe;
    first sealing means, in the interior of the first sealing member, for providing an axially-slidable, substantially gas-tight sealing engagement with the exterior of the pipe;
    second sealing means, on the exterior of the first sealing member, for providing a substantially gas-tight attachment to the sheet;
    a second tubular sealing member, having an interior and an exterior, dimensioned to fit around the exterior of the pipe;
    a hollow tubular sleeve, dimensioned to fit around the exterior of the pipe, and having a first end sealingly attached to the first sealing member and a second end sealingly attached to the second sealing member, thereby joining the first and second sealing members in axial alignment; and
    third sealing means, in the interior of the second sealing member, for providing an axially-slidable, substantially gas-tight sealing engagement with the exterior surface of the pipe.

10. The device of claim 9, wherein the third sealing means includes an O-ring seal disposed in the interior of the second sealing member.

11. The device of claim 10, wherein the uncompressed inside diameter of the O-ring seal of the third sealing means is slightly smaller than the outside diameter of the pipe, whereby the O-ring seal of the third sealing means is slightly compressed when it is engaged against the exterior of the pipe.

12. The device of claim 9, wherein the first sealing member has a first end and a second end, with the second sealing means adjacent the second end, and wherein the sealing member includes an inwardly-directed annular first lip adjacent the first end, the inside diameter of the first lip being slightly larger than the outside diameter of the pipe.

13. The device of claim 12, wherein the third sealing member has a first end joined to the sleeve and a second end, the second end having an inwardly-directed annular second lip, the inside diameter of the second lip being slightly larger than the outside diameter of the pipe.

* * * * *